INVENTORS
Davies Allport
Walter I. Myers
BY *Strauch, Nolan & Yule*
ATTORNEYS

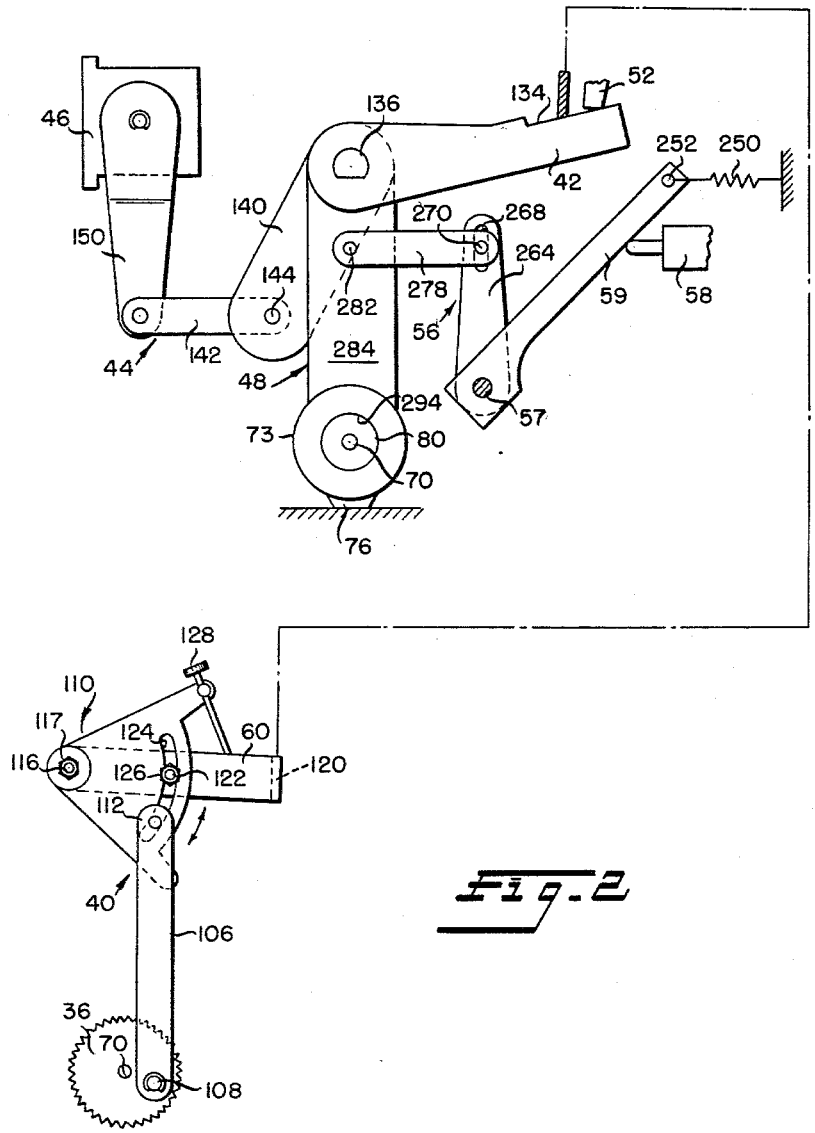

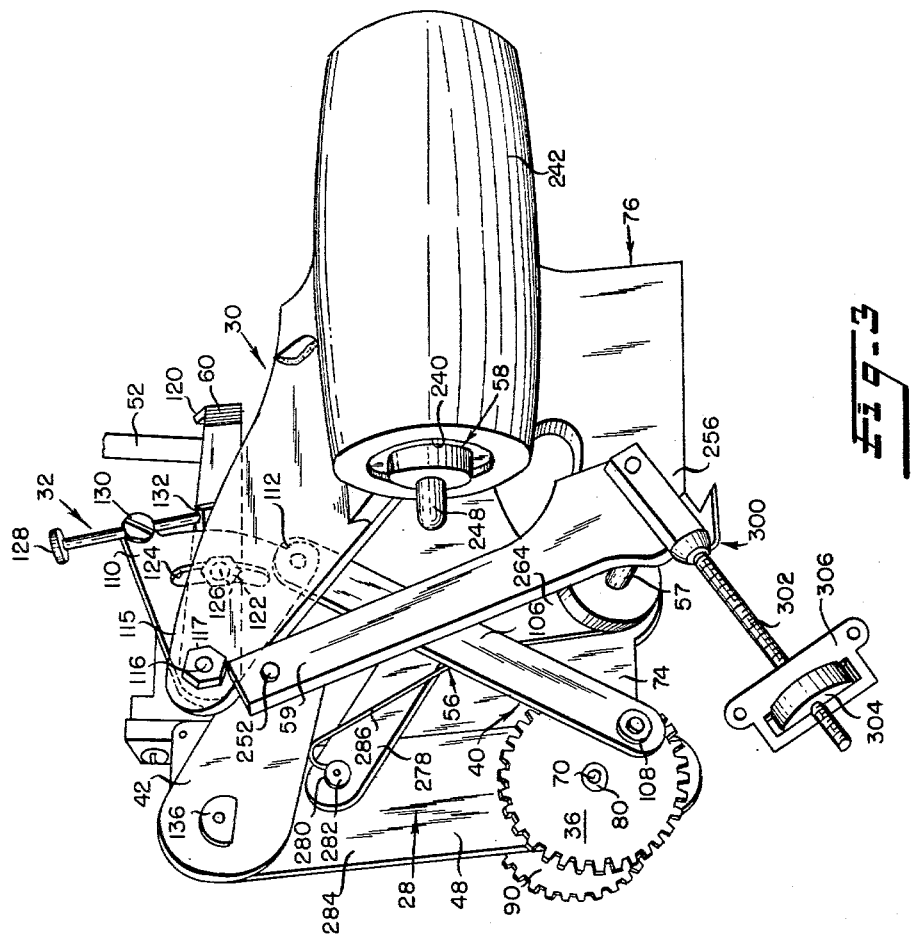

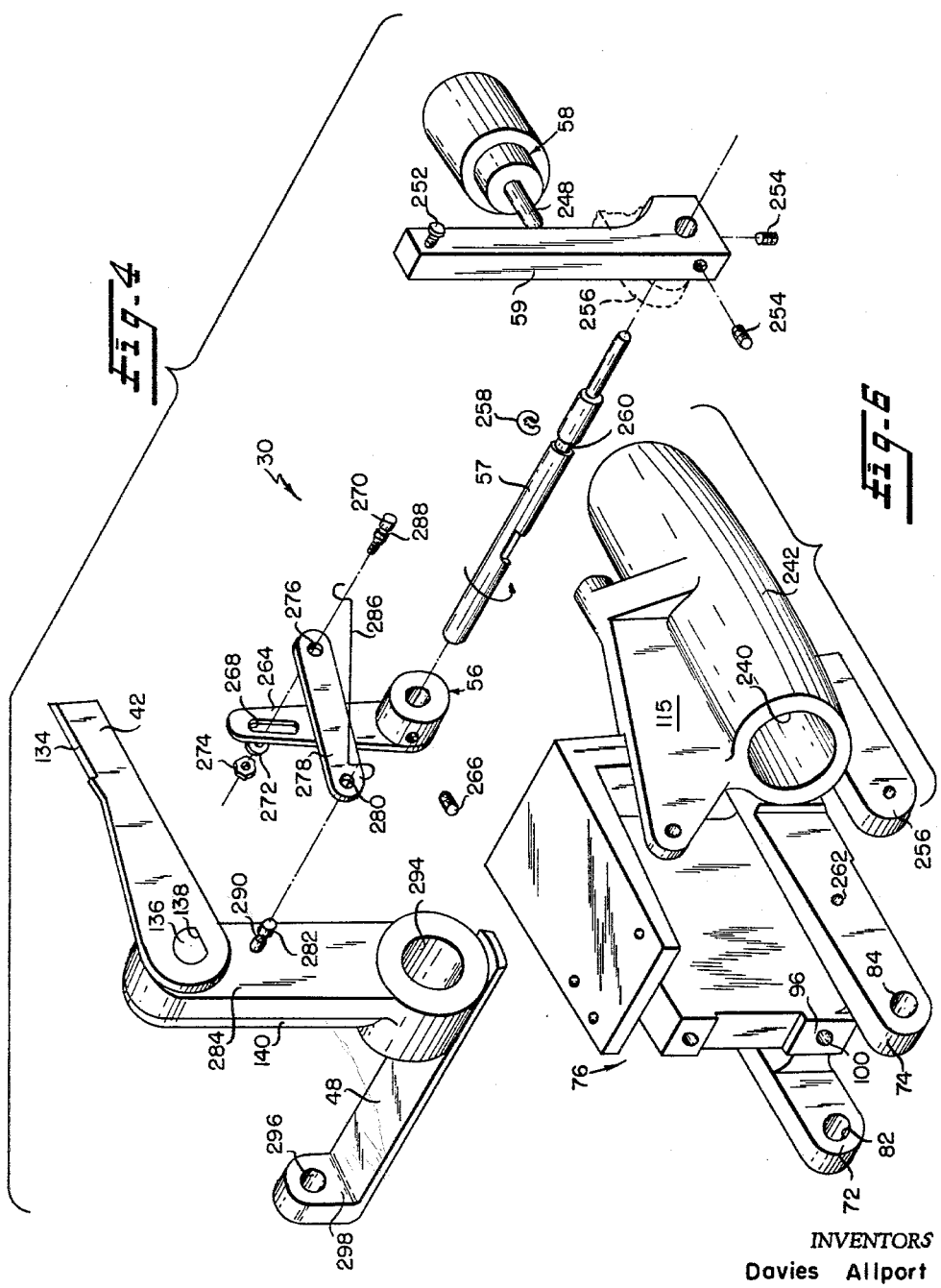

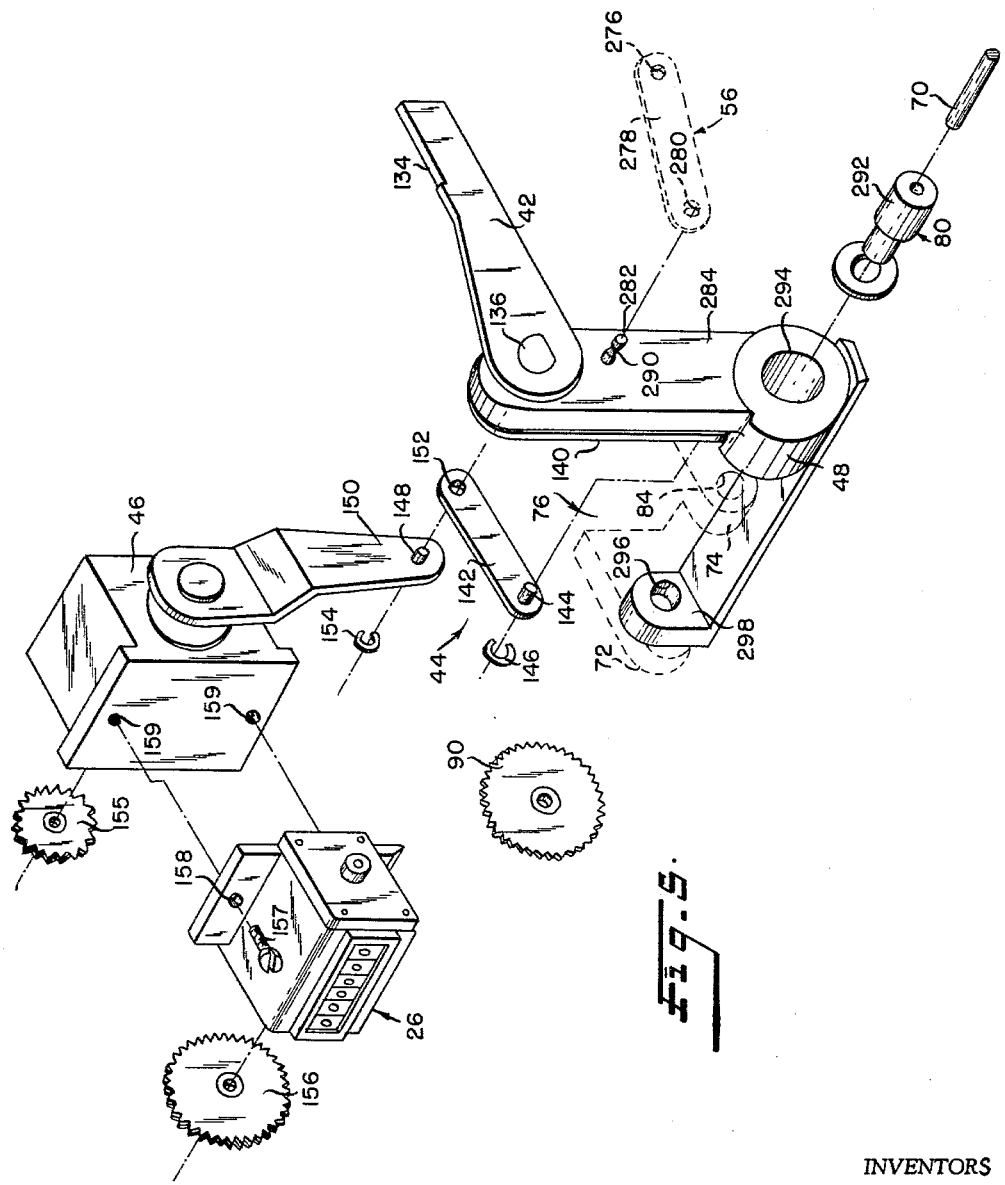

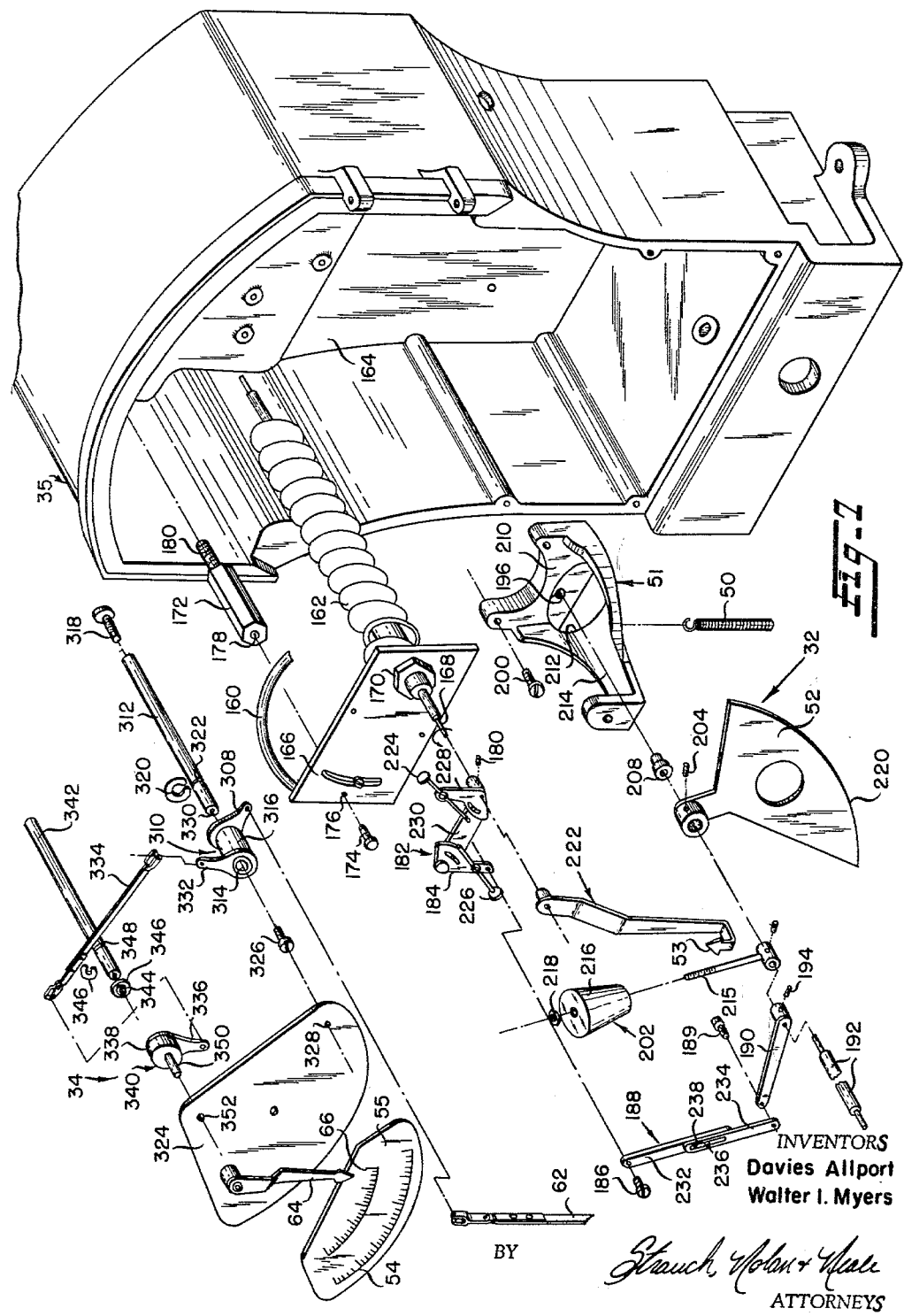

United States Patent Office 3,169,399
Patented Feb. 16, 1965

3,169,399
FLUID METERING APPARATUS WITH PRESSURE AND TEMPERATURE COMPENSATION
Davies Allport and Walter I. Myers, Tulsa, Okla., assignors to Rockwell Manufacturing Company, a corporation of Pennsylvania
Filed May 17, 1962, Ser. No. 195,551
15 Claims. (Cl. 73—233)

This invention relates to apparatus for providing an indication of the cumulative volume of fluid passed through a fluid meter and, more specifically, to apparatus for correcting a metered volume of fluid to base temperature and pressure and registering a cumulative corrected volume.

The usual gas meter registers the volume of gas passing through it without compensating for variations in the temperature or pressure of the flowing gas. However, the contracts between utilities and their larger customers often base the charge for the gas on the volume consumed reduced to a base pressure, and in some instances, to a base temperature.

Apparatus for metering gas consumption, correcting the metered volume to a preselected base pressure, and registering a cumulative total of the corrected volume directly and without the necessity of laborious and time-consuming calculations is disclosed in United States Patent No. 2,093,151 issued September 14, 1937 to A.D. MacLean. This apparatus, however, does not compensate for the variations in the temperature of the metered gas. Lack of temperature compensation may be disadvantageous where gas is consumed in larged quantities under circumstances where its temperature undergoes significant variations or where the contract between a utility and its customer includes a charge rate based upon consumption at a base temperature and pressure.

It is, therefore, an object of the present invention to provide apparatus for continuously correcting a metered volume of gas to a base pressure and temperature and directly recording the corrected cumulative volume.

It is a further specific object of the present invention to improve apparatus of the type disclosed in the pattent referred to above by providing mechanism for correcting a metered flow of gas to a base temperature as well as a base pressure.

Devices for correcting metered volumes of gases to a base temperature and pressure have heretofore been proposed. Exemplary of the prior art devices is that illustrated in United States Patent No. 2,861,453 issued to H. Gehre, Nov. 25, 1958, for "Volume Correction Apparatus for Gas Meters." In general, the prior art devices are not sufficiently accurate for many purposes because of stresses imposed on the sensing elements and/or operating components of these devices during operation.

It is, therefore, a further object of the present invention to provide flow volume correcting and registering apparatus which is more rugged and less vulnerable to stresses on the operating components than the prior art devices and which will, therefore, provide greater accuracy over a longer period than these devices.

In conjunction with the foregoing objects, it is a further object of the present invention to provide volume correcting and registering apparatus which consists of a small number of simple and readily accessible mechanical subsystems and which is, therefore, economical to manufacture and maintain.

Other objects and the various novel features of the present invention will become fully apparent from the appended claims and as the ensuing detailed description and discussion proceeds in conjunction with the accompanying drawings, in which:

FIGURE 2 is a diagrammatic view of the operating mechanism of the apparatus provided by the present invention;

FIGURE 3 is a perspective view of a portion of the cumulative register operating mechanism and the mechanism provided for correcting the metered gas volume to a base temperature, certain of the operating components being displaced from their normal operating positions to better illustrate their relation to the elements with which they coact.

FIGURE 4 is an exploded view of the temperature compensation mechanism employed in the present invention;

FIGURE 5 is an exploded view of the mechanism provided for transmitting the motion of the meter-connected drive apparatus to the register indicating the corrected cumulative volume;

FIGURE 6 is a perspective view of an integrating bracket employed in the present invention; and FIGURE 7 is an exploded view of an assembly employed to provide a continuous indication of the temperature and pressure of the metered gas.

Figure 1:
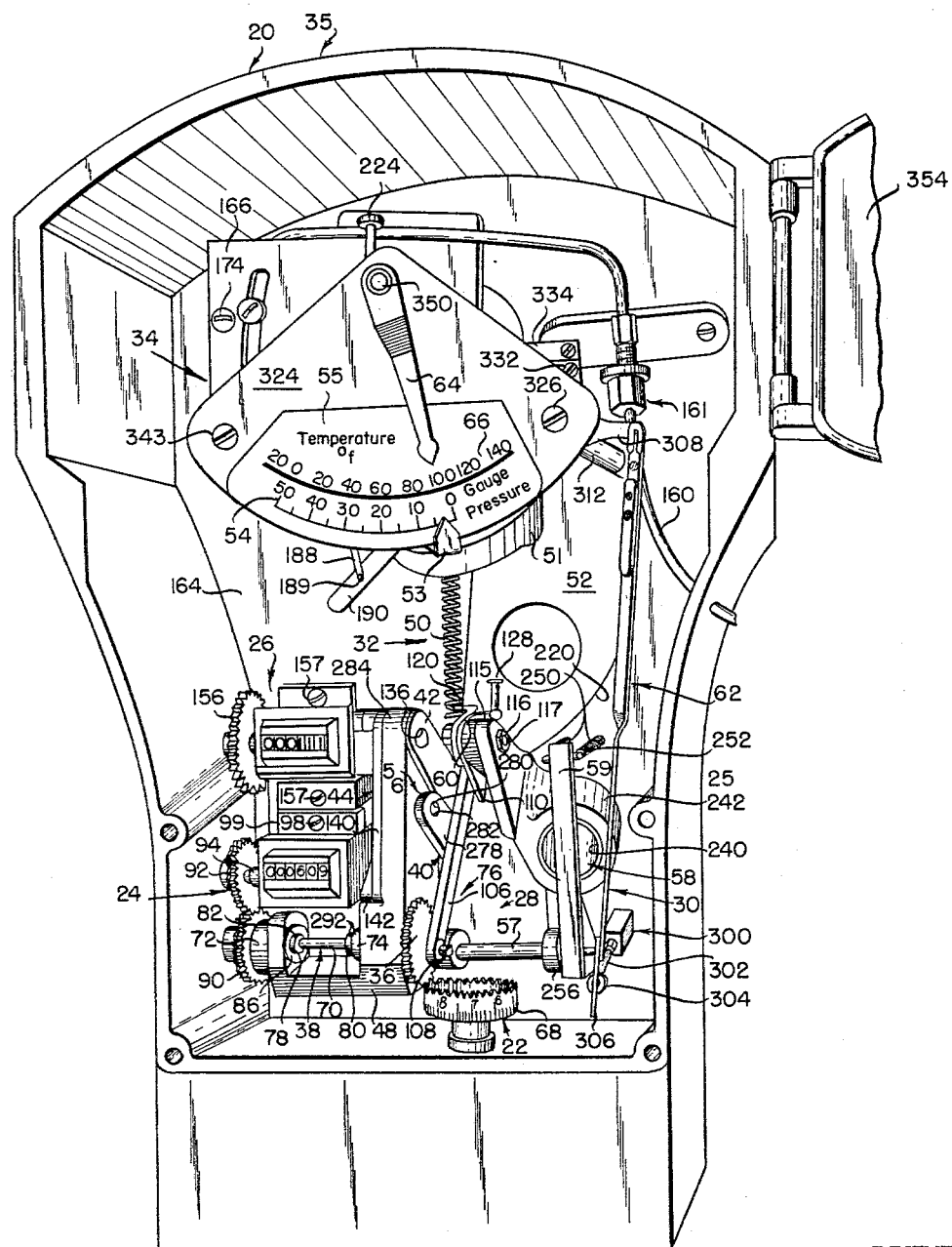
FIGURE 1 is a perspective elevational view of the novel volume correcting and registering apparatus of the present invention.

Referring now to the drawings, the novel volume correcting and registering apparatus 20 illustrated in FIGURE 1 includes a drive shaft 22 connected to the output element of a fluid meter (not illustrated), an uncompensated or "uncorrected volume" totalizing register 24, a compensated or "corrected volume" totalizing register 26, a drive 28 for the compensated register, temperature compensation mechanism 30, pressure compensation mechanism 32, and pressure and temperature indicating mechanism indicated generally by reference character 34. All of these components and subsystems are housed in a casing 35.

Drive shaft 22 is connected by a spur gear 36 to a drive train 38 which operates uncompensated register 24 and to a drive train 40, incorporated in compensated register drive 28, which converts the rotary motion of drive shaft 22 to oscillatory motion of a register operating member 42. Operating member 42 is connected to compensated register 26 by a linkage 44 and a one-way clutch 46 (see FIGURES 2 and 5) and advances the register through increments proportional to the angle through which it oscillates.

Oscillating member 42 is pivoted on a bracket 48 pivoted about a fixed axis in the casing and is displaced by drive train 40 from the initial position shown in FIGURE 1 to a fixed terminal position. A spring 50, connected to member 42 adjacent its free end and to a bracket 51 (see FIGURE 7), which will be described in detail presently, returns the member to the initial position.

Pressure compensation mechanism 32 includes a cam 52 which varies the initial position of member 42 to limit the angle through which the member oscillates as the pressure of the metered fluid varies. Pressure compensation mechanism 32 also includes a linkage connected to a pivotally mounted indicator 53 forming part of the temperature and pressure indicating mechanism 34 which cooperates with a pressure scale 54 on a scale stricker 55 to provide a continuous indication of the pressure of the metered fluid.

The pivotable bracket 48 on which oscillating member 42 is carried may be moved through an arcuate path by a linkage 56 actuated by a rotatable or rockable shaft 57. As the temperature of the metered fluid varies, shaft 57 is rocked by the piston of the operating element 58 of a conventional thermostat incorporated in temperature compensation mechanism 30 which acts through a lever 59 fixed to the shaft. As bracket 48 is rocked, the point at which the output member or arm 60 (see FIGURE 3) of drive train 40 engages oscillating member 42 is varied, altering the angle through which the oscillating member is displaced with a corresponding alteration in the increment through which the compensated register 26 is advanced.

As shaft 57 rotates, it also, acting through a link 62, moves a pivotally mounted indicator 64 in pressure and temperature indicating mechanism 34 which cooperates with a temperature scale 66 on scale sticker 55 to continuously indicate the temperature of the metered fluid.

Fixed to the upper end of drive shaft 22 is a miter gear 68 which meshes with the spur gear 36 forming the input to drive trains 38 and 40. Miter gear 68, in addition to transmitting the motion of the drive assembly shaft to spur gear 36, functions as a proving dial or index for checking the accuracy of the volume correcting and registering apparatus 20. The details of miter gear 68, which form no part of the present invention, are described in the MacLean patent referred to above to which reference may be had if deemed necessary.

Spur gear 36 is fixed on the right-hand end of a horizontally extending shaft 70 as by a setscrew. Shaft 70 is rotatably supported in spaced apart, forwardly extending bosses 72 and 74 formed on an integrating bracket 76 (see FIGURE 6) fixed to casing 35 and extends through cylindrical bushings 78 and 80 which are fixed in aligned apertures 82 and 84 in bosses 72 and 74. Bushing 78 is retained in aperture 82 by a retainer ring 86. Bushing 80 may be similarly retained in aperture 84.

Fixed on the left-hand end of shaft 70 is a spur gear 90. Spur gear 90 meshes with a spur gear 92 which is the input to uncompensated register 24 and which is fastened on register input shaft 94. Register 24 is secured to a vertical, forwardly directed mounting surface 96 (see FIGURE 6) on integrating bracket 76 by a cap screw 98 which extends through a register mounting flange 99 into an aperture 100 in the integrating bracket. The lower end of a connecting arm 106 is eccentrically pivoted to spur gear 36 at 108. The upper end of connecting arm 106 is pivotally connected to a pivotally mounted adjusting yoke assembly 110 forming a part of drive train 40 at 112.

Adjusting yoke assembly 110 is pivotally mounted on a vertical, forwardly and upwardly extending ear 115 of integrating bracket 76 as by a cap screw 116 and a nut 117. Also pivotally mounted on cap screw 116 is the rearwardly extending arm 60 which, as mentioned above, is the output member of drive train 40. Arm 60 has a laterally extending actuator 120 formed at its free or rear end. Arm 60 is connected to adjusting yoke assembly 110 by a pin 122 fastened to arm 60 and extending through an arcuate slot 124 formed in adjusting yoke assembly 110 and a nut 126.

The relative angular relationship of adjusting yoke assembly 110 and arm 60 may be varied by loosening nut 126 and rotating an adjusting screw 128. The adjusting yoke assembly 110 and the arm 60, the details of which form no part of the present invention, are described in the MacLean patent referred to above to which reference may be had if deemed necessary.

The laterally extending integral actuator 120 of arm 60 is so arranged in relation to register operating member 42 that, when it is moved downwardly by connecting arm 106 acting through assembly 110, it will engage a knifeedge portion 134 formed on the upper edge of member 42 (see FIGURES 4 and 5).

Register operating member 42 (see FIGURE 5) is fixed to the right-hand end of a shaft 136 rotatably mounted in the upper end of pivotable bracket 48. Shaft 136 is surrounded by suitable bearings (not shown) and mounts, on its left-hand end, a depending arm 140 which is fixed to shaft 136 (see FIGURE 2).

With reference now to FIGURE 5, an elongated link 142 of linkage 44 is pivotally connected to the lower end of arm 140 by a horizontal pin 144 (see FIGURE 3) and a retaining ring 146. The opposite end of link 142 is pivotally mounted on a pin 148 fastened to the lower end of a clutch arm 150. A retaining ring 154 secures the clutch arm on the pin.

Clutch 46, which is preferably of the one-way type, is fixed on integrating bracket 76. The input member of clutch 46 is the clutch arm 150, described above. The output member is a shaft (not shown) on which is mounted a spur gear 155 which meshes with the input spur gear 156 of the compensated totalizing register 26. Register 26 is secured to clutch 46 by cap screws 157 extending through apertures 158 in the register housing into apertures 159 in the clutch housing.

The volume correcting and registering apparatus 20 is preferably and normally employed with a fluid meter having an output element which rotates at a speed proportional to the volume of fluid flowing through a meter. As was described above, this output element is drive-connected to the drive shaft 22 of the apparatus. As the meter output revolves, therefore, it causes rotation of miter gear 68 and the spur gear 36 with which the miter gear meshes. As spur gear 36 rotates, it rotates the shaft 70 of uncompensated register drive train 38, causing rotation of spur gear 90 and spur gear 92, the input element of uncompensated register 24. Uncompensated register 24 provides an uncompensated cumulative indication of the volume of fluid flowing through the meter.

As spur gear 36 rotates, it also causes reciprocation of connecting arm 106. Referring now especially to FIGURES 2 and 3, as connecting arm 106 moves downwardly it pulls adjustable yoke assembly 110 in a downwardly (or clockwise) direction about the cap screw 116 on which it is mounted. Arm 60, because of the mechanical connection between it and adjusting yoke assembly 110, moves downwardly with the latter. As it moves downwardly, its laterally extending actuator 120 engages the knife-edge portion 134 formed on the rear end of oscillating register actuator member 42, rotating the latter and the shaft 136 to which it is fixed in a clockwise direction in pivotally mounted bracket 48. Since depending arm 140 of register operating linkage 44 (see FIGURE 5) is fixed to shaft 136, it also moves in a clockwise direction, pulling link 142 forwardly and thereby causing clutch arm 150 to rotate in a clockwise direction.

During clockwise rotation of clutch arm 150, the clutch is engaged and its output shaft and spur gear 155, therefore rotates, causing rotation of spur gear 156, the input member of compensated totalizing register 26. Register 26 is advanced through a predetermined increment proportional to the angular displacement of its input member.

Adjusting yoke assembly 110 (and, therefore, arm 60) is displaced or pivoted to a fixed terminal position by connecting arm 106. Since arm 60 engages the knife-edge portion 134 of oscillating register actuating member 42 during the downward portion of its travel, member 42 will be moved to a predetermined terminal position. Member 42 is returned upwardly (i.e., in a counterclockwise direction) to its initial position by the spring 50, referred to above.

To compensate for variations in the pressure of the metered fluid and to correct the metered volume to a base pressure, the upward limit of the travel of register actuating member 42 is limited by cam 52. The details of the pressure compensation mechanism 32, in which cam 52 is incorporated, are disclosed in the patent to MacLean referred to above to which reference may be had if deemed necessary.

Referring now to FIGURE 7, pressure compensation mechanism 32 includes, in addition to the cam 52, a pressure sensing element (not illustrated) responsive to the pressure of the metered fluid connected by a pressure pipe 160 to a pressure motor 162 fastened to the rear wall 164 of casing 35. The front end of motor 162 is supported by a bearing plate member 166 through which its output shaft 168 extends. Motor 162 is retained in place by a nut 170 threaded over its forward end into abutting relationship with bearing plate 166.

Bearing plate 166 is secured in spaced relationship to the rear wall 164 of casing 35 by posts 172 (one of which is shown) and cap screws 174 which extend through apertures 176 in the bearing plate into apertures 178 in the post. Suitable nuts (not shown) secure these posts to the casing rear wall.

Fixed to the output shaft 168 of pressure motor 162 by a setscrew 180 is a motion transmitting linkage 182. Pivotally connected to the output member 184 of motion transmitting linkage 182 by a cap screw 186 is a camshaft connecting link 188. The opposite end of camshaft connecting link 188 is pivotally connected by a similar fastener 189 (see FIGURE 1) to the free end of a crank 190.

The opposite end of crank 190 is fixed on a camshaft 192 by a setscrew 194. Camshaft 192 is journalled in an aperture 196 in the camshaft supporting casting 51 which is secured to the rear wall 164 of casing 35 by screws 200, only one of which is shown. Also journalled on camshaft 192 are the cam 52, described above, and a cam counterbalancing assembly 202. Cam 52 and cam counterbalancing assembly 202 are fixed to the camshaft by setscrews 204 and 206, respectively. A cylindrical spacer 208 is fixed on camshaft 192 between the hub of cam 52 and the rear wall 210 of casting 51 to insure freedom of movement of the cam relative to the housing. An arcuate slot 212, formed in the lower wall 214 of casting 51, permits movement of cam 52 as it is rotated by camshaft 192.

Counterbalancing assembly 202 is provided for balancing cam 52. It includes an arm 215 which, as described above, is fixed to camshaft 192 by setscrew 206, and a counterbalance weight 216, threaded onto the threaded upper end of arm 215. Weight 216 may be threaded inwardly or outwardly on arm 215 to secure the proper balance and is secured in the desired position by a lock nut 218.

As the pressure of the metered fluid varies, the pressure sensing element (not illustrated) transmits the variations in pressure through line 160 to motor 162 which translates the variations of pressure into angular displacement of its output shaft 168. In the ensuing description of the operation of the pressure compensating mechanism 32, it will be assumed that the pressure motor output shaft rotates in the counterclockwise direction, looking from left to right in FIGURE 7, although it is to be understood that the operation is the same when the output shaft rotates in the opposite direction.

Angular displacement of pressure motor output shaft 168 in a counterclockwise direction causes the motion transmitting linkage 182 to rotate in a similar direction, moving camshaft connecting link 188 in a downwardly direction. As the camshaft connecting link 188 moves downwardly, it rotates camshaft connecting arm 190 and, therefore, camshaft 192 in a counterclockwise direction. Cam 52, being rotatively fixed to camshaft 192, also rotates in a counterclockwise direction, varying the portion of its edge or cam surface 220 contacting the upper surface of the compensated register operating arm 60 to thereby vary the extent of its return travel in the manner described above.

Also fixed to the output shaft 168 of pressure motor 162 is a depending pressure indicator assembly 222 at the lower end of which is formed the pressure indicator 53 which, as described above, cooperates with the pressure scale 54 on scale sticker 55 to provide a continuous visual indication of the pressure of the metered fluid.

In order to adjust the above-described motion transmitting linkage interposed between the output shaft 168 of pressure motor 162 and cam 52, adjusting screws 224 and 226 are provided for adjusting the angle at which the output member 184 and input member 228 of motion transmitting linkage 182 are disposed to its longitudinally extending member 230. The details of the motion transmittign link 182, which form no part of the present invention, are illustrated in FIGURE 9 of the MacLean patent referred to above and are described in detail in that patent.

To provide a further adjustment, camshaft connecting link 188 is formed from a pair of members 232 and 234, connected by one or more screws 236 extending through an elongated slot 238 in connecting link member 234, into connecting link member 232. A further adjustment may be made, as was described above, by rotating counterweight 216 on its supporting arm 215.

Referring now to FIGURES 1–4, thermostatic operating element 58 is mounted in a forwardly opening cylindrical bore 240 in a housing 242 formed as an integral part of integrating bracket 76 (see FIGURES 3 and 6). Operating element 58 is connected, in the conventional manner, to a sensing element (not illustrated) disposed to sense the temperature of the metered fluid. The piston 248 of operating element 58 engages the rear surface of lever 59 which is biased into engagement with the free end of the piston by air pair of coiled springs 250 connected at their forward ends to a pin 252 extending through the end of lever 59 and, at their rear ends, to the rear wall 164 of housing 35.

Referring now to FIGURE 6, the horizontally extending shaft 57, to which lever 59 is rotatively fixed by setscrews 254, is supported, at its right-hand end, in a forwardly extending boss 256 formed on the lower right-hand corner of integrating bracket 76. Axial movement of shaft 57 is prevented by level 59 and by a retaining ring 258.

The opopsite (i.e., the left-hand) end of shaft 57 is supported in an aperture 262 formed in the forwardly extending boss 74 of integrating bracket 76 (see FIGURE 6).

With reference now to FIGURES 3 and 4, a vertically extending crank arm 264 is fixed on shaft 57 adjacent its left-hand end as by a setscrew 266. Mounted in a vertical extending slot 268 formed adjacent the upper end of 264 is a vertically adjustable pivot stud 270 which is secured in place by a lock washer 272 and a nut 274. Pivot stud 270 extends through an aperture 276 formed in the rear end of a forwardly extending connecting link 278. The forward end of connecting link 278 is provided with a through aperture 280 through which extends a pivot stud 282 fastened to a vertically extending arm 284 of pivotable bracket 48. Connecting link 278 is retained in place on pivot studs 270 and 282 by a spring clip 286.

Referring next to FIGURE 5, bracket 48 is pivotable on an enlarged diameter portion 292 of bushing 80 which extends through a horizontal cylindrical bore 294 in the lower end of bracket arm 284 and the bushing 78 surrounding shaft 70 which extends through a horizontal aperture 296 in a vertically projecting boss 298 formed on the left-hand end of the bracket.

As the temperature of the metered fluid increases, piston 248 is forced out of thermostatic operator 58, rotating lever 59 forwardly (or counterclockwise as viewed from the right side of the apparatus) against the bias of springs 250. As the upper end of lever 59 moves forwardly, shaft 57 rotates in the direction indicated by the arrow in FIGURE 4 (i.e., counterclockwise). Since crank arm 264 is rotatively fixed to shaft 57, it likewise pivots or rotates in a counterclockwise direction, moving link 278 forwardly and thereby rotating upstanding arm 284 of pivotal bracket 48 in a counterclockwise direction on bushings 78 and 80.

As bracket 48 rotates in a counterclockwise direction, it moves oscillating compensated register operating arm 42 forwardly. Since adjusting yoke assembly 110 and, therefore, arm 60 and its laterally directed actuator 120 are fixed relative to casing 35, this movement changes the point at which the actuator 120 of arm 60 contacts the knife-edge portion 134 of oscillating member 42. As a consequence, the angle through which register operating member 42 is driven by drive assembly 40 is varied.

As the temperature of the metered fluid falls, springs 250 force piston 248 back into thermostatic operating element 58, rotating lever 59 in a clockwise direction to again vary the point at which integral actuator 120 of arm 60 contacts the knife-edge 134 of oscillating member 42 to compensate for the decreasing fluid temperature.

Temperature compensation mechanism 30 and pressure compensation mechanism 32 operate independently and each has an independent effect on the angle through which register operating member 42 is displaced. As a result, member 42 will be moved through different angles as the temperature of the metered fluid varies even though its pressure remains constant. Similarly, variable pressure will effect the angular travel of member 42 even though the temperature remains constant. Thus, the metered volume will be continuously corrected for both temperature and pressure variations.

As the position of register operating member 42 is varied, depending arm 140 (see FIGURES 2 and 5) will vary the magnitude of horizontal motion transmitted to connecting link 142. In order that this variation in horizontal movement accurately reflect the variation in corrected volume of the metered fluid, the sine of the angle through which member 42 is displaced must equal the angle in radians. As a consequence, integral arm 284 of pivotal bracket 48 must be dimensioned so that changes in pressure will not move depending arm 140 more than a minimum distance from the position in which depending arm 140 and clutch arm 150 are disposed at right angles to connecting link 142.

Referring now to FIGURES 1 and 3, journalled on the right-hand end of the shaft 57 of temperature compensation mechanism 30 is a forwardly extending crank arm and bracket assembly 300 which is fixed to the shaft as by a setscrew. Assembly 300 includes a forwardly extending, threaded shaft 302 on which is mounted a knurled counterweight 304 supporting a connecting bracket 306.

With continued reference to FIGURE 1 and with reference to FIGURE 7, link 62 is pivotally connected, at its lower end, to connecting bracket 306 and, at its upper end, to one arm 308 of a bell crank assembly 310. Bell crank 310 is rotatively mounted on an elongated cylindrical post 312 which is attached to the rear wall 164 of casing 35 as by a setscrew 318. Bell crank 310 is prevented from moving along post 312 by a retaining ring 320 and by a scale plate 324 on the front of which is mounted the scale sticker 55 described above. Scale plate 324 is secured to the front end of post 312 as by a setscrew 326.

The other arm 332 of bell crank 310 is pivotally connected as by a screw to one end of a connecting link 334. The opposite end of connecting link 334 is connected in a similar manner to the arm 336 of a crank 338 incorporated in a temperature indicating shaft assembly 340.

Temperature indicating shaft assembly 340 is rotatable on a post 342 which is identical to the post 312 described above and to which scale plate 324 is affixed by a screw 343. Assembly 340 is fixed on post 342 by a washer 344 and a retaining ring 346.

Temperature indicating shaft assembly 340 also includes a shaft 350, fixed to crank 338, which extends forwardly through an aperture 352 in scale plate 324. Fixed to the forward end of shaft 350 is the temperature indicator 64 which, as described above, cooperates with a scale 66 printed on scale sticker 55 to provide a continuous visual indication of the temperature of the metered fluid.

The details of housing 35 are not critical and may be varied as desired. Preferably the housing is provided with a hinged cover 354 (only a portion of which is illustrated) and a lower cover (not illustrated) which may be secured in place to prevent unauthorized persons from tampering with the volume correcting and registering mechanism. Suitable windows may be provided in these covers to permit the reading of registers 24 and 26 and the temperature and pressure scales on sticker 55 without removing the covers.

This invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In apparatus for correcting the volume of gas metered by a positive displacement type gas meter to base pressure and temperature:
    (a) means including a lever member cyclically movable about a pivot at a frequency directly proportional to the metered rate of flow and output means drive connected to said lever member and cyclically movable therewith, said lever member having a variable angular displacement and a variable effective length for varying its amplitude of movement and the amplitude of movement of the output means connected thereto;
    (b) means including temperature sensing means and a first motion transmitting drive mechanism operatively interposed between the temperature sensing means and the cyclically movable member continuously varying the effective length of said member in inverse proportion to variations in the temperature of the metered gas;
    (c) independent means including pressure sensing means and a second motion transmitting drive mechanism comprised entirely of elements distinct from those in the first motion transmitting drive mechanism operatively interposed between the pressure sensing means and the cyclically movable member for continuously varying the angular displacement of said member in direct proportion to variations in the pressure of the metered gas;
    (d) totalizing register means for registering the corrected flow; and
    (e) means connected between said output means and said totalizing register means for advancing the latter at a rate directly proportional to the frequency of movement of said movable member through increments directly proportional to the amplitude of movement of said output means, said register advancing means providing the sole input to said totalizing register means.

2. In apparatus for correcting the metered flow of a positive displacement type fluid meter to a base pressure and temperature and providing an indication of the cumulative volume of the flow:
    (a) a member and means pivotally mounting said member;
    (b) means adapted to be driven by the displacement element of the meter to angularly displace said member from an initial position to a terminal position at a frequency proportional to the flow rate of the metered gas;
    (c) means including means for displacing said mounting means for continuously varying the angle through which said member is displaced in inverse proportion to variations in the temperature of the metered gas including temperature sensing means and a first motion transmitting drive mechanism operatively interposed between the temperature sensing means and said mounting means;

(d) means continuously varying said initial position to thereby vary the angle through which said member is displaced in direct proportion to variations in the pressure of the metered gas including pressure sensing means and a second motion transmitting drive mechanism comprised entirely of elements distinct from those in the first motion transmitting drive mechanism operatively interposed between the pressure sensing means and the pivotally mounted member; and (e) totalizing register means advanceable by said pivoted member at a rate directly proportional to the frequency at which it is angularly displaced through increments directly proportional to the magnitude of the angles through which it is displaced.

3. In apparatus for correcting the volume of a metered gas flow to base pressure and temperature and providing an indication of the corrected, cumulative volume:

(a) a pivotally mounted member adapted to be oscillated about its pivot point from an initial position to a terminal position at a frequency proportional to the rate of flow of the metered gas;

(b) means adapted to be driven by a positive displacement type meter and operatively connected to said pivoted member for angularly displacing said member from said initial position to said terminal position;

(c) resilient biasing means for returning said member to its initial position;

(d) means continuously varying said initial position to thereby vary the angle through which said member is displaced in each period of oscillation in direct proportion to variations in pressure of the metered gas;

(e) means continuously varying the distince between said pivot point and the point at which said driven means is operatively connected to said pivoted member to vary the angle through which said pivoted member is moved in each period of oscillation in inverse proportion to variations in temperature of the metered gas; and (f) totalizing register means advanced by said pivoted member at a rate directly proportional to the frequency at which said member is oscillated through increments directly proportional to the amplitudes of the oscillations.

4. The apparatus as defined in claim 3, wherein the means for varying the initial position of said pivoted member comprises:

(a) pivotally mounted cam means having a cam surface engaged by and thereby limiting the return movement of said pivoted member as the latter is biased to its initial position by said resilient member in each oscillatory period; and (b) means responsive to the pressure of the metered gas for pivoting said cam about its mount in response to variations in the pressure of the metered gas.

5. The combination as defined in claim 3, including:

(a) bracket means mounting said pivoted member on one end thereof; and (b) shaft means extending through the opposite end of said bracket means, said bracket means being fixed to said shaft means to rotate therewith; and (c) wherein the means for varying the point at which said driving means is operatively connected to said pivoted member comprises:

(i) an elongated member having one end rotatively fixed to the said shaft means; and (ii) thermostatic means having a temperature sensing element adapted to communicate with the metered gas and extensible actuating means operatively connected to said elongated member.

6. Apparatus for registering the cumulative volume of a flow of fluid corrected to base temperature and pressure, comprising:

(a) means adapted to be driven by the output member of a positive displacement type fluid meter at a speed proportional to the flow of fluid through said meter;

(b) cumulative register means;

(c) motion transmitting means operatively connected between said driven means and said cumulative register means including a pivotally mounted member adapted to be engaged by and displaced through a preselected angle by said driven means;

(d) means for varying said angle as the temperature of the metered fluid varies including means for varying the point at which said motion transmitting means engages said pivotally mounted member;

(e) said cumulative register means being advanced through increments proportional to the angle of displacement of said pivotally mounted member at the speed of said meter driven means.

7. The apparatus as defined in claim 6, including means for varying said angle as the pressure of the metered fluid varies, said means including adjustable stop means interposed in the path of said pivotally mounted member.

8. The apparatus as defined in claim 7:

(a) wherein the means for varying the point at which the motion transmitting means engages said pivotally mounted member comprises pivotally mounted bracket means; and (b) including temperature responsive means for pivoting said bracket means as the temperature of the metered fluid varies; and (c) means for adjusting the angle through which said bracket means is pivoted for a change of a given magnitude in the temperature of the metered fluid.

9. The apparatus as defined in claim 6, including:

(a) one-way clutch means having input means and output means for advancing said cumulative register, said input means including an elongated clutch arm;

(b) a first elongated link having one end rotatively fixed to said pivotally mounted member; and (c) a second elongated link having one end pivotally fixed to the free end of said first elongated link and having its opposite end pivotally connected to said clutch arm;

(d) the angles between said first and second elongated links and between said second elongated link and said clutch arm being substantially right angles.

10. Apparatus as defined in claim 1, together with:

(a) means providing a continuous indication of the pressure of the metered gas; and (b) means providing a continuous indication of the temperature of the metered gas.

11. In a meter for indicating the flow of gas corrected to a predetermined base pressure and a predetermined base temperature, said meter having a support mounting a shaft rotated by the flow of gas, a cumulative volume indicator, drive mechanism interposed between said shaft and said indicator comprising a lever rockable about a pivot, means responsive to changes in pressure of said gas for varying the amplitude of movement of said lever to correct the registered volume at said indicator to said base pressure, and means responsive to changes in temperature of said gas for varying the effective length of said lever to simultaneously correct the registered volume at said indicator to base temperature.

12. In a meter for indicating the flow of gas corrected to a predetermined base pressure and a predetermined base temperature, said meter having a support mounting a shaft rotated by the flow of gas, a cumulative volume indicator, drive mechanism interposed between said shaft and said indicator comprising a lever rockable about a pivot, means responsive to changes in pressure of said gas for varying the amplitude of movement of said lever to correct the registered volume at said indicator to said base pressure, and means responsive to changes in temperature of said gas for shifting the pivot of said lever to simultaneously correct the registered volume at said indicator to said base temperature.

13. The meter as defined in claim 12, wherein said lever is mounted on a pivoted bracket and said temperature responsive means rocks said bracket.

14. The meter as defined in claim 13, including a crank fixed to a rockable shaft and a link pivoted at opposite ends to said bracket and said crank, and wherein said temperature responsive means rocks said shaft.

15. The meter as defined in claim 12, wherein an actuator is fixed to said shaft and said temperature responsive means pivots said actuator.

References Cited in the file of this patent
UNITED STATES PATENTS

| | | |
|---|---|---|
| 2,059,547 | Brandl | Nov. 3, 1936 |
| 2,093,151 | MacLean | Sept. 14, 1937 |
| 2,491,548 | Branson | Dec. 20, 1949 |
| 2,662,757 | Mock | Dec. 15, 1953 |
| 2,844,963 | Stewart | July 29, 1958 |
| 2,886,969 | Dufour | May 19, 1959 |

FOREIGN PATENTS

| | | |
|---|---|---|
| 530,082 | France | Sept. 24, 1921 |